March 4, 1930.  R. W. STROUT  1,749,360

FRICTION CLUTCH DRIVEN PRESS

Filed April 28, 1928  2 Sheets-Sheet 1

INVENTOR:
Robert W. Strout,
By Attorneys,
Fraser, Myers & Manley

INVENTOR:
Robert W. Strout,
By Attorneys
Fraser, Myers & Manley

Patented Mar. 4, 1930

1,749,360

UNITED STATES PATENT OFFICE

ROBERT W. STROUT, OF BROOKLYN, NEW YORK, ASSIGNOR TO E. W. BLISS COMPANY, OF BROOKLYN, NEW YORK, A CORPORATION OF DELAWARE

FRICTION-CLUTCH-DRIVEN PRESS

Application filed April 28, 1928. Serial No. 273,739.

This invention relates to power presses and similar machinery driven through a friction-clutch. The object of the invention is to provide an improved construction for facilitating the dismounting of the clutch for repairs or other purposes.

In the accompanying drawings,—

The drawings show the invention as applied to a conventional type of upright power press such as a punching press. It is to be understood that this illustration is merely by way of example, since the invention is applicable to any machine which it is desirable to drive through a friction clutch in order that the drive may slip in starting or under an exceptional load or obstruction.

Figure 1:
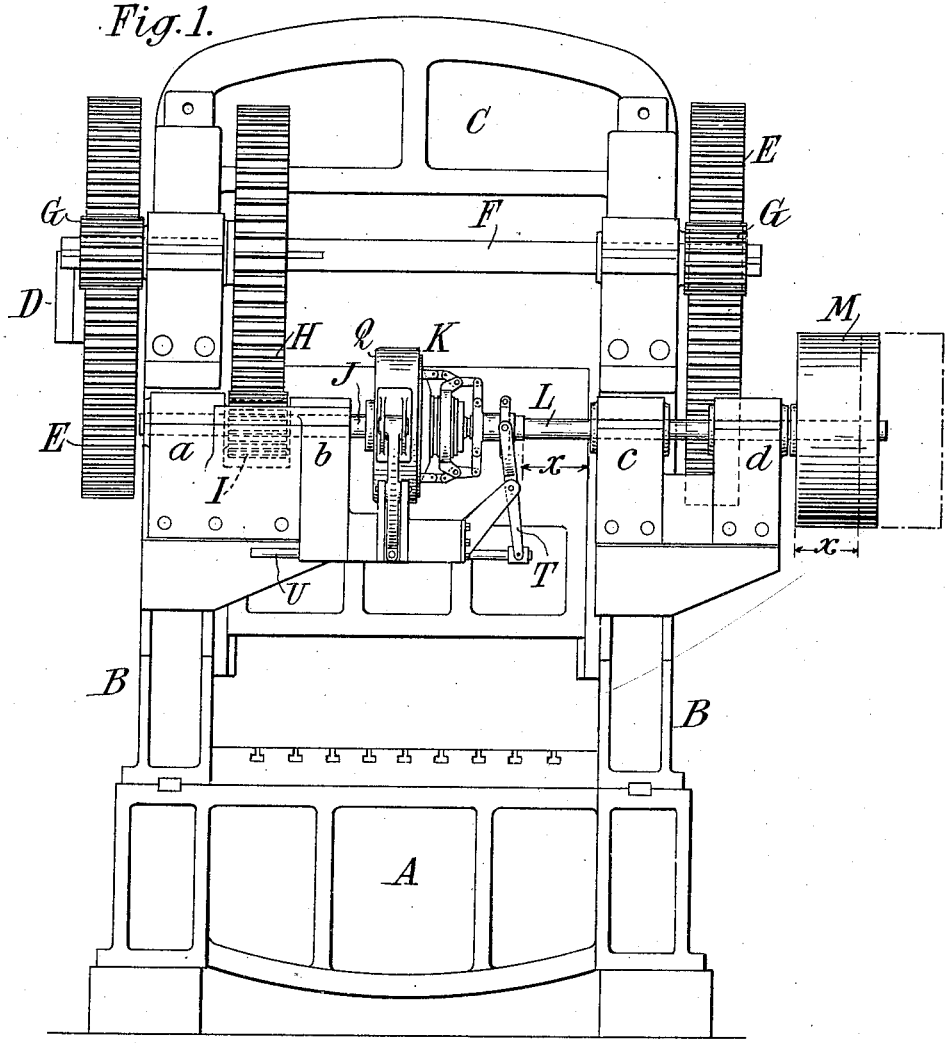
Figure 1 is a rear elevation of a press having a friction-clutch drive according to this invention.

A shows the base of such a press, and B B its side frames carrying a top frame or crown C. The main shaft D of the press has bearings as usual in the side frames B B. This main shaft has gears E E on its opposite ends, which are driven from an intermediate shaft F which has bearings on the rear side of the upright frames and has pinions G G meshing with and driving the gears E E. The shaft F has also a gear H which is driven by a pinion I on a drive-shaft J. The shaft J is driven through a friction clutch K from a primary drive-shaft L which is driven by a belt pulley M or some equivalent driving means. In Fig. 1 the pulley M is what is known as an outboard pulley, being hung outside the frame of the machine; in Fig. 2 the pulley is an inboard pulley, being mounted between the side frames B B of the machine. Both constructions are well known. For clearness, the construction shown in Fig. 1 and illustrated in more detail in Fig. 3 will first be described.

The shaft J has bearings at $a$, $b$, formed in any suitable frame or bracket which may be applied to the rear of one or both the upright main frames B B of the press. The shaft L is carried in bearings $c$ and $d$ similarly formed on a bracket attached to the rear of the main frame. The clutch K is of a usual construction of friction clutch, being in this example of the disk type. Such a clutch has a driving member P connected to and driven by the shaft L; and a driven member Q connected to and driving the shaft J. The driving member P is formed with a flange $e$ and has splined to it a follower $f$, and between these are alternated driving and driven disks, the driving disks $g$ (of any desired number) being splined to the driving member P; and the driven disks $h$ $h$ being splined externally to the inner side of the driven member Q which is formed as a cup or drum. The disks $g$ or $h$ (or both) are faced with any suitable frictional wearing facing, such as of asbestos composition, as is well known. The driving member P is shown as mounted on roller bearings $i$, $j$, on the shaft J. For forcing the follower $f$ toward the flange $e$ in order thereby to clamp the intervening disks together and apply the clutch, a sliding sleeve R is splined on the shaft L and engaged by a non-rotative ring S which is carried within a fork T' on a lever T operated by a sliding rod U from any suitable starting device such as a treadle. Such starting means are so well known that it has not been thought necessary to illustrate the same. Between the sleeve R and the follower $f$ is interposed any suitable communicating mechanism by which the sliding movement of the sleeve is transmitted to the follower to force it in direction toward the flange $e$, whereby to clamp the disks together in well understood manner. For this purpose one of several known means is shown, consisting of levers $k$ operated from the sleeve R by toggle links $l$ and having their opposite arms connected by links $m$ to the follower. When the sleeve R is moved in one direction the toggles $l$ act to thrust out the arms of the levers $k$ to which they are jointed, so as to cause their other arms and the links $m$ to have a toggle action such as to force the follower toward the disks. The levers $k$ are pivoted on brackets projecting from a ring $n$ splined to the member P so as to turn with it, and reacting against a ring o which is fastened on the outer end of the member P. The construction of clutch thus far described is typical of disk friction clutches and forms no part of the present invention.

The primary drive-shaft L is connected to the driving member P of the clutch by being formed with an end flange L' fastened by bolts p to the driving member P. For carrying the driving strain the parts L' and P are provided with reciprocal radial ribs and grooves r, s. The shaft L may be of uniform diameter throughout, and is so fitted in its bearings c, d, that by removing the bolts p and unpinning such of the toggle link connections as may be necessary, the shaft L may be slid to the right a distance which, for example, may correspond with the dimension arrow x in Fig. 1, whereby the pulley M is carried out to the position shown in dotted lines. This displacement of the shaft L is sufficient to enable all the internal parts of the clutch to be removed from within the drum Q. This permits of making any necessary repairs to the clutch, such as the re-facing of the disks h h. In order that the driving member P may be displaced (if necessary) the roller bearing j is made removable, for which purpose its inner ring or race j' is held in place by a cap t bolted to the reduced end of the shaft J, and which cap can be unbolted and removed at will whenever the shaft L has been displaced to the right.

Thus the present invention makes it readily possible to dismount the clutch sufficiently to enable the necessary replacements, adjustments, or repairs to be made without taking the shaft L out of its bearings, and by merely sliding this shaft to the right a sufficient distance.

Figure 2:
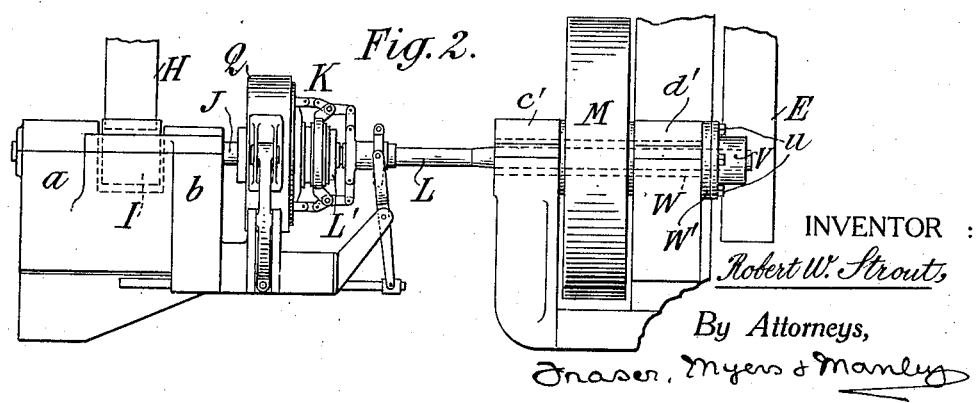
Fig. 2 is a fragmentary rear elevation corresponding to a portion of Fig. 1 and showing a somewhat different construction.
Figure 3:
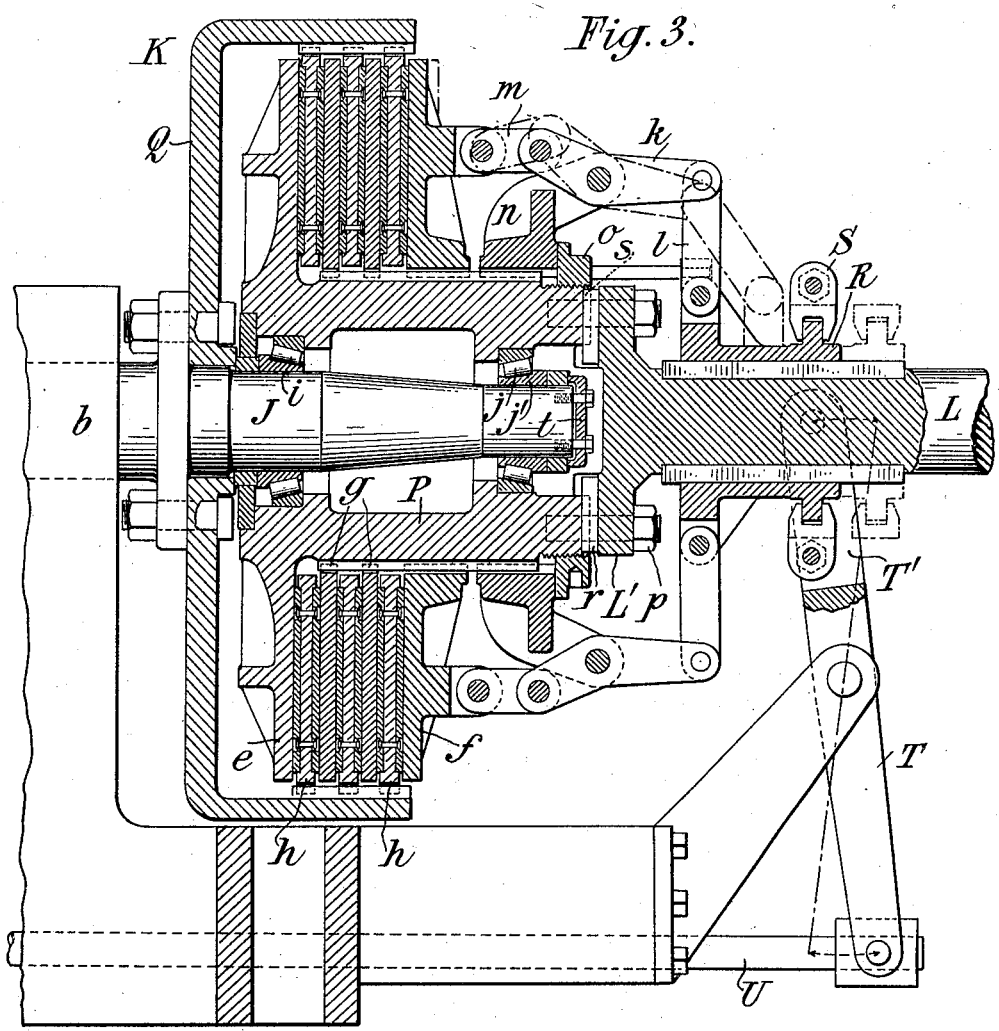
Fig. 3 is a vertical axial mid-section through the clutch and appurtenant parts.
Figure 4:
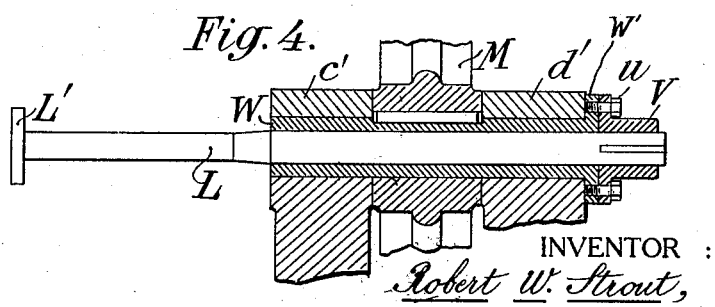
Fig. 4 is a fragmentary vertical axial section of a portion of Fig. 2.

In the construction shown in Fig. 2, where the pulley M is mounted inboard, a similar displacement of the shaft L is provided for, but without any corresponding displacement of the pulley M, because this pulley is confined between the bearings here lettered c', d', it being an object of this invention to enable the shaft L to be carried to the right sufficiently far for making the necessary clutch repairs without opening these bearings. For this purpose the construction best shown in Fig. 4 is adopted. Here, the shaft L is the same as before, and has the same flange L' at its end, but at its right-hand end, instead of carrying the pulley on it, it carries instead a sleeve V which is keyed to it; and the pulley, instead of being mounted directly on the shaft L, is mounted on a tubular shaft or quill W, to which it is keyed between the bearings; the tubular shaft W to the right of the bearing d' has a flange W' to which a meeting flange on the sleeve V is bolted by bolts u. The parts, when assembled, occupy the positions shown in Fig. 4. To disassemble the clutch it is only necessary to remove the bolts u, whereupon the shaft L (its bolts p uniting its flange L' to the clutch member P having been previously removed) may be slid to the right within the tubular shaft W, and without changing the position of this shaft or of the pulley.

By means of the present invention the clutch may be opened or disassembled, and repairs or replacements made, much more conveniently and quickly than heretofore, since it is no longer necessary to remove the primary drive-shaft from its bearings, nor to open these bearings.

What I claim is:—

1. A clutch-driven press or the like having primary and secondary drive shafts and an intervening friction clutch, having driving and driven members, the primary shaft removably united to the driving member of the clutch and slidably mounted to be displaced endwise for giving access to the clutch.

2. Apparatus according to claim 1, the primary shaft mounted in separate bearings and slidably movable therein without opening the bearings.

3. Apparatus according to claim 1, the primary shaft mounted in separate bearings and connected to its driving member outside such bearings.

4. Apparatus according to claim 1, the primary shaft enclosed within a tubular shaft and normally fastened thereto so that they turn as one, with bearings for such tubular shaft and a driving pulley between said bearings, the pulley keyed to the tubular shaft and the latter connected to the primary shaft outside such bearings, so that by removing such connections it may be slidably displaced to give access to the clutch.

In witness whereof, I have hereunto signed my name.

ROBERT W. STROUT.